March 6, 1934.      D. B. KNIGHT      1,950,147
REFRIGERATION
Filed Dec. 20, 1928
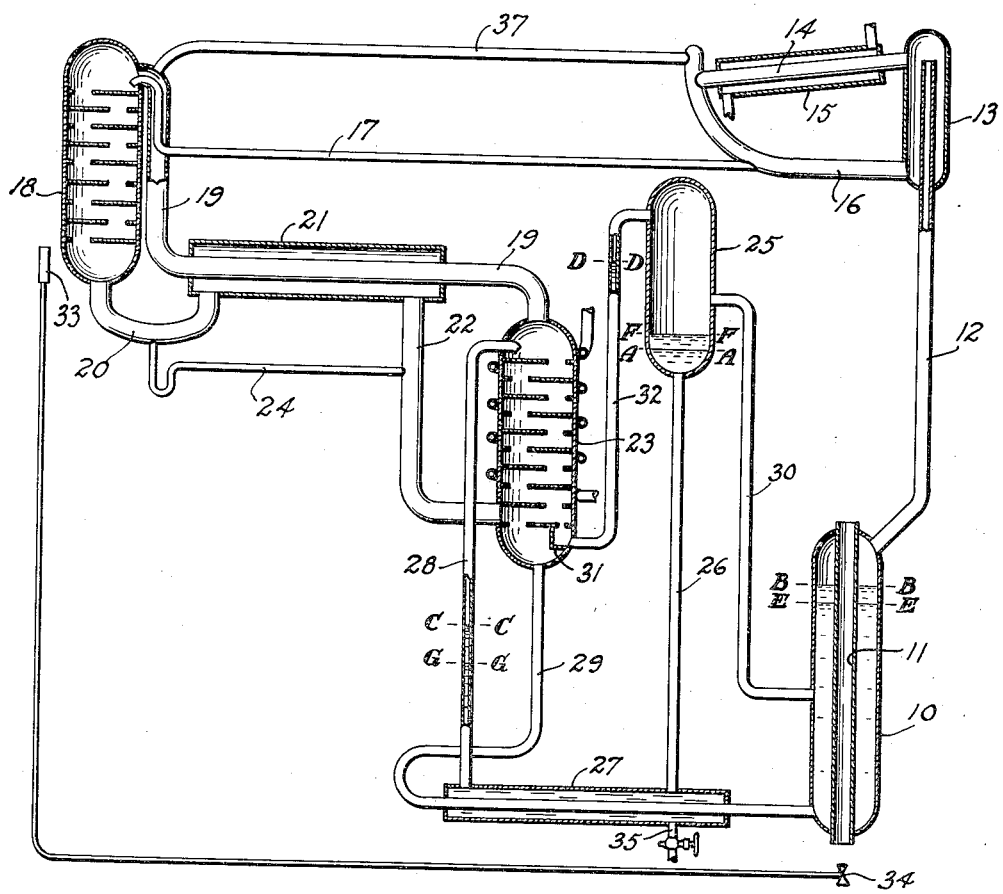
INVENTOR
Donald B. Knight
BY
Wm. J. Hedlund
his ATTORNEY Patented Mar. 6, 1934

1,950,147

UNITED STATES PATENT OFFICE 1,950,147

REFRIGERATION

Donald B. Knight, Brooklyn, N. Y., assignor to Electrolux Servel Corporation, New York, N. Y., a corporation of Delaware Application December 20, 1928, Serial No. 327,213

27 Claims. (Cl. 62—119.5)

This invention relates to fluid circulating systems and more particularly to the circulation of absorption liquid in refrigerating systems of the absorption type.

One object of the invention, and the particular object of the invention, is to effect circulation of absorption liquid in a heated refrigerating apparatus in accordance with conditions within the system of apparatus and independently of the amount of heat supplied. More specifically I aim to circulate the absorption liquid in accordance with internal conditions of the part of the system which is in heat exchange relation with the objective of refrigeration and, therefore, in accordance with demand for refrigeration. Particularly, I utilize a rise of pressure of refrigerant in the evaporator to obtain circulation of absorption liquid.

Still more particularly my invention relates to apparatus of the type wherein an auxiliary agent is introduced, in the presence of which the refrigerant or cooling agent evaporates, the purpose of the auxiliary agent being to partly or wholly equalize the pressure within the refrigerating system and permit a unit having no valves or other moving parts.

In refrigerating apparatus of these types, and particularly of the last mentioned equalized pressure type, it is customary to circulate absorption liquid without regard to, or not in accordance with, evaporator conditions. The circulation of absorption liquid is usually dependent upon the amount of heat supplied. In apparatus of this type on the market, however, there are many factors which influence the amount of absorption liquid circulated and the rate of circulation cannot be predetermined with accuracy. While heat input is customarily controlled in accordance with the demand for refrigeration through the agency of a temperature responsive element subject to variations of temperature in the material or space to be refrigerated, a variation of heat input by such means does not always cause a corresponding change in circulation of absorption liquid.

My invention results in the rate of circulation being controlled in accordance with the load or demand for refrigeration and provides a constant concentration of absorption liquid in different parts of the absorption liquid cycle at all times of operation and provides direct regulation of absorption liquid flow by load conditions. As the load increases the rate of circulation of absorption liquid increases and conversely as the load decreases the rate of circulation of absorption liquid decreases.

My invention is based upon the following characteristic of equalized pressure absorption apparatus. The characteristic, however, is also existent in other types. The characteristic is this: That, as has been observed, when no absorption liquid enters the absorber of an absorption system of the equalized pressure type, the pressure within the apparatus rises. This is due to the fact that the partial pressure of the cooling agent in the auxiliary agent is no longer maintained at a point where it corresponds to a given evaporator temperature. As heat is continuously supplied to the evaporator from the objective of refrigeration, the temperature in the evaporator consequently rises and the partial pressure of the cooling agent rises with it along the vapor-pressure curve. As the partial pressure of the cooling agent rises, the total pressure within the apparatus rises by a related amount. This rise of pressure which occurs when no absorption liquid is supplied to the absorber may be used to cause flow of absorption liquid between the generator and absorber.

One apparatus for carrying out the invention is more or less diagrammatically illustrated in the accompanying drawing showing a refrigerating system of the equalized pressure type embodying the invention.

The system shown on the drawing comprises a generator 10 containing a solution of cooling agent in absorption liquid. For purposes of description I will designate, but without limitation, the refrigerant as ammonia and the absorption liquid as water though it will be understood that various fluids may be used. The generator is heated by any suitable means. I have shown a flue 11 extending through the generator through which combustion products may pass or in which an electric heating element may be inserted. In the generator ammonia is driven out of solution and gaseous ammonia passes upwardly through conduit 12 to rectifier 13.

Rectifier 13 may be any of various known types, for example, that which is cooled by condensed refrigerant fluid, as shown. Ammonia vapor freed from the vapor of entrained absorption liquid passes out of the top of conduit 12 and into condenser 14 which is suitably cooled either by air or by cooling water. A cooling water jacket is indicated at 15. A connection 16 permits liquid ammonia to flow from condenser 14 to the space around the upper part of conduit 12 within rectifier 13. It is the liquid ammonia in this space which causes condensation of water vapor in the upper part of conduit 12. This space around the upper part of conduit 12 is connected with condenser 14 so that ammonia re-evaporated in the rectifier may pass back into the condenser. Suitable baffles may be used in the rectifier.

Liquid ammonia passes through conduit 17 from member 16 and flows into evaporator 18. Hydrogen gas or other inert gas contained in the system passes into the evaporator from conduit 19. A mixture of ammonia and hydrogen gas is formed in the evaporator which flows downwardly through the evaporator and through conduit 20 to the outer space of heat exchanger 21 and thence through conduit 22 and into absorber 23. A part of conduit 19, which connects the upper part of the absorber with the upper part of the evaporator, forms the inner conduit of heat exchanger 21. A drain pipe 24 permits liquid to flow from conduit 20 to conduit 22. It will be readily understood that the evaporator-absorber cycle may be arranged in a variety of ways.

A vent pipe 37 connects the upper part of conduit 16 or other suitable portion of the condenser-rectifier system to a convenient part of the evaporator-absorber cycle for removing from the condenser hydrogen which may be entrained along with absorption liquid passing from the absorber to the generator. The evaporator and absorber are equipped with the usual disks over which liquid cascades. The absorber is cooled by suitable means.

What I have described so far is in general the type of apparatus dealt with in Patent No. 1,609,334.

A circulation vessel 25 is placed at a higher level than the absorber so that liquid may flow therefrom through conduit 26, the outer part of heat exchanger 27 and conduit 28 into the upper part of the absorber. Conduit 29 connects the lower part of the absorber with the lower part of the generator and a part of this conduit forms the inner conduit of heat exchanger 27. A conduit 30 connects an intermediate point of generator 10 with an intermediate point of circulation vessel 25. A pocket 31 is formed in the lower disk of the absorber and is connected by means of conduit 32 with the upper part of circulation vessel 25. It will be apparent that the pocket 31 and the conduit 32 form a liquid trap or seal between the absorber and the upper part of the circulation vessel 25 and that conduit 26, outer part of heat exchanger 27, and conduit 28 form a second liquid trap or seal between the lower part of the circulation vessel 25 and the upper part of the absorber 23.

It will be understood that the evaporator is in heat exchange relation with the space or substance to be cooled, that is, the objective of refrigeration, and has attached thereto a suitable casting or other member holding ice trays. The supply of heat is controlled by a thermostat 33, situated so as to be responsive to load on the refrigerating apparatus, which controls element 34 suitably related to the type of heat-giving substance supplied so as to decrease the heat supply on fall of temperature and increase the heat supply on rise of temperature.

Before describing the flow within the system and the operation thereof, I will describe the preferred manner of filling the system with fluids in order that the running operation may be more readily understood. First, the inert gas, preferably hydrogen, is passed into the machine through the valve 35 which is attached to heat exchanger 27 or other suitable low point of the U-shaped connection between the bottom of vessel 25 and the top of absorber 23. After hydrogen to a desired pressure has been forced into the apparatus, a solution of ammonia and water is forced in against the hydrogen pressure, also through the valve 35. This liquid first fills the U-shaped loop 26—27—28. Some of the liquid then passes into circulation vessel 25 to a level A—A which is at the height of the connection of conduit 28 into the absorber. The liquid then flows into the absorber, over the absorber disks and into conduit 29. As the liquid flows over the absorber disks it fills pocket 31 which is closed except for a top opening through the lowest absorber disk and the connection with conduit 32. The liquid now fills conduit 29 passing through the inner tube of the heat exchanger and into generator 10 filling it to a level B—B. When the filling is complete liquid will stand in conduit 29 to a height equal to the level B—B. Valve 35 is now closed and the system is put in operation by supplying heat to the generator.

Ammonia vapor is driven off from solution in the generator 10, is rectified in rectifier 13 and condensed in condenser 14. Liquid ammonia collects in conduit 16 and passes through conduit 17 into the evaporator. In the evaporator the liquid ammonia flows over disks and evaporates into hydrogen. During this initial generation of ammonia vapor, condensation of the same and evaporation of the same there is not sufficient absorption liquid on the disks in the absorber to absorb the ammonia at a rate corresponding to its diffusion into the hydrogen. Pressure is, therefore, built up in the system due to the evaporation of ammonia and the consequent rise in the partial pressure of the ammonia vapor.

As the pressure rises in the whole system the liquid in the generator is forced down and liquid is forced up through conduit 30 and into vessel 25. At the same time liquid in conduit 28 is forced down to the level C—C. Also liquid is forced from the pocket 31 up through the conduit 32 to the level D—D. In this process the liquid columns in conduit 30, conduit 32 and in loop 26—27—28 will balance.

Liquid is now forced from the generator through conduit 30 and into vessel 25. This continues until the level in the generator falls to E—E. When this condition has been reached, the level in vessel 25 will have risen to F—F. Also the level in conduit 28 will have fallen to G—G and the level in conduit 32 will have risen to the point of outlet into the vessel 25. Liquid, therefore, also begins to flow into vessel 25 from the pocket 31. Pocket 31, being small, is quickly emptied of its liquid and when this occurs hydrogen gas flows through conduit 32 and this causes an equalization of pressure to take place, the pressure in vessel 25 then becoming equal to that in the rest of the system.

At this time the level in the vessel 25 has risen to F—F as a result of the liquid supplied to the generator through conduit 30. As this level is higher than the outlet of the conduit 28 into the absorber and as the pressure is now equalized throughout, liquid flows by gravity through conduit 26, the outer part of heat exchanger 27 and conduit 28 into the absorber. As the absorption liquid enters the absorber it absorbs the ammonia present in the hydrogen gas, reducing the partial pressure of ammonia and consequently reducing the total pressure in the system. As the pressure goes down hydrogen gas is driven back into the absorber from vessel 25 through conduit 32 and through the liquid which is again collected in pocket 31 but which due to its slight head offers very little resistance.

When the level in vessel 25 has again fallen to the balanced position A—A no further flow takes place and pressure in the system again begins to rise when the rate of evaporation of ammonia exceeds the rate of absorption. I am now back to the original condition explained and the cycle of operation is ready to repeat. It will have been observed that the absorption liquid which passed from conduit 28 into the absorber at the time of equalized pressure passes through conduit 29 and into the generator to the original level B—B.

It will be seen that the amount of liquid circulated depends entirely and directly upon the amount of heat supplied to the evaporator and, therefore, on the amount of refrigeration necessary to be supplied. The heat supply serves only to give sufficient heat to regenerate a sufficient amount of ammonia corresponding to that evaporated. This gives a theoretically accurate relationship inasmuch as thermostat 33 controls the generation of ammonia vapor and the evaporation of this ammonia vapor controls the rate of circulation of absorption liquid and at the same time controls the rate of circulation of inert gas. The whole system is, therefore, tied up to the evaporation of ammonia which is the factor most closely related to demand for refrigeration.

While I have described one preferred form of apparatus for carrying out the invention in accordance with the patent statutes, it will be obvious to those skilled in the art that various other changes may be made in the construction and arrangement without departing from the spirit of the invention and therefore the invention is not limited to what is shown in the drawing and described in the specification but only as indicated in the following claims.

Having thus described my invention, what I claim is:

1. That improvement in the art of refrigerating by the aid of an absorption system including an evaporator, an absorber and a generator which consists in periodically moving absorption liquid in circulatory flow between the generator and the absorber, accumulating absorption liquid in the path of said circulatory flow from the generator to the absorber, periodically discharging the accumulated absorption liquid into the absorber, and controlling the movement of the absorption liquid due to condition of the refrigerant in the evaporator.

2. A refrigerating system comprising a generator, a condenser, an absorber, an evaporator, a circulation vessel, a conduit connecting the absorber with the generator, a conduit connecting the generator with the circulation vessel and a plurality of conduits connecting the circulation vessel with the absorber, the conduits being so connected that variations of pressure in the absorber cause liquid and vapor alternately to fill one of the conduits between the absorber and circulation vessel and thereby cause circulation of absorption liquid between the generator and absorber.

3. That improvement in the art of refrigerating through the agency of an absorption system including a generator, an evaporator and an absorber which consists in periodically lifting absorption liquid above the absorber due to rise of pressure in the absorber and causing the liquid to flow into the absorber when the pressure in the absorber rises a given amount.

4. In an absorption refrigerating apparatus, an evaporator, an absorber and interconnecting conduits forming a gas circulating cycle, a generator and means for circulating an absorption liquid between and through said generator and absorber in intermittent periods of absorption liquid discharge into the absorber, said means being controlled by conditions within said cycle.

5. In an absorption refrigerating apparatus of the type containing an inert gas into which a refrigerant evaporates, an evaporator, an absorber and interconnecting conduits forming a gas circulating cycle for the inert gas, a generator and means for circulating an absorption liquid between and through said generator and absorber in intermittent periods of absorption liquid discharge into the absorber, said means being controlled by conditions within said cycle.

6. In an absorption refrigerating apparatus, an evaporator, an absorber and interconnecting conduits forming a gas circulating cycle, a generator and means for circulating an absorption liquid between and through said generator and absorber in intermittent periods of absorption liquid discharge into the absorber, said means being controlled by pressure within said cycle.

7. In an absorption refrigerating apparatus of the type containing an inert gas into which a refrigerant evaporates, an evaporator, an absorber and interconnecting conduits forming a gas circulating cycle for the inert gas, a generator and means for circulating an absorption liquid between and through said generator and absorber in intermittent periods of absorption liquid discharge into the absorber, said means being controlled by pressure within said cycle.

8. A refrigerating system comprising a generator, an absorber, an evaporator, means to circulate an inert gas between and through said absorber and evaporator, means to circulate a refrigerant from said generator to said evaporator where it evaporates in the presence of the inert gas, and means controlled by variations in pressure due to varying rates of evaporation of said refrigerant for circulating absorption liquid between the generator and absorber in intermittent periods of absorption liquid discharge into the absorber.

9. A refrigerating system comprising a generator, an absorber, an evaporator, means to circulate an inert gas between and through said absorber and evaporator, means to circulate a refrigerant from said generator to said evaporator where it evaporates in the presence of the inert gas and means controlled by conditions of refrigerant in the evaporator for circulating absorption liquid between the generator and absorber in intermittent periods of absorption liquid discharge into the absorber.

10. In an absorption refrigerating apparatus, an evaporator, an absorber and interconnecting conduits forming a gas circulating cycle, a generator, means to heat said generator to circulate a refrigerant from the generator to the evaporator, said means responsive to temperature conditions of the evaporator and means for circulating an absorption liquid between and through said generator and absorber in intermittent periods of absorption liquid discharge into the absorber, said last-mentioned means being controlled by conditions within said cycle.

11. In an absorption refrigerating apparatus, an evaporator, an absorber and interconnecting conduits forming a gas circulating cycle, a generator, means to heat said generator to circulate a refrigerant from the generator to the evaporator, said means responsive to temperature conditions of the evaporator and means for circulating an absorption liquid between and through said generator and absorber in intermittent periods of absorption liquid discharge into the absorber, said last-mentioned means being controlled by conditions within said cycle and independent of said heating means.

12. In an absorption refrigerating apparatus of the type containing an inert gas into which a refrigerant evaporates, an evaporator, an absorber and interconnecting conduits forming a gas circulating cycle for the inert gas, a generator, means to heat said generator to expel vaporous refrigerant therefrom, means to liquefy said refrigerant, means to conduct liquid refrigerant to said evaporator where it evaporates in the presence of the inert gas, said means to heat said generator being responsive to temperature conditions of the evaporator, and means for circulating an absorption liquid between the generator and absorber comprising a vessel situated at a relatively high level with respect to the absorber and means to periodically produce a liquid column between the absorber and said vessel, said circulating means being controlled by conditions within said cycle.

13. In an absorption refrigerating apparatus of the type containing an inert gas into which a refrigerant evaporates, an evaporator, an absorber and interconnecting conduits forming a gas circulating cycle for the inert gas, a generator, means to heat said generator to expel vaporous refrigerant therefrom, means to liquefy said refrigerant, means to conduct liquid refrigerant to said evaporator where it evaporates in the presence of the inert gas, said means to heat said generator being responsive to temperature conditions of the evaporator, and means for circulating an absorption liquid between the generator and absorber comprising a vessel situated at a relatively high level with respect to the absorber and means to periodically produce a liquid column between the absorber and said vessel, said circulating means being controlled by pressure within said cycle.

14. In an absorption refrigerating apparatus of the type containing an inert gas into which a refrigerant evaporates, an evaporator, an absorber and interconnecting conduits forming a gas circulating cycle for the inert gas, a generator, means to heat said generator to expel vaporous refrigerant therefrom, means to liquefy said refrigerant, means to conduct liquid refrigerant to said evaporator where it evaporates in the presence of the inert gas, said means to heat said generator being responsive to temperature conditions of the evaporator, and absorption liquid circulating means between the generator and absorber operative to periodically introduce absorption liquid into the absorber, said last-mentioned means being controlled by conditions within said cycle and independent of the aforesaid heating means.

15. In an absorption refrigerating apparatus of the type containing an inert gas into which a refrigerant evaporates, an evaporator, an absorber and interconnecting conduits forming a gas circulating cycle for the inert gas, a generator, means to heat said generator to expel vaporous refrigerant therefrom, means to liquefy said refrigerant, means to conduct liquid refrigerant to said evaporator where it evaporates in the presence of the inert gas, said means to heat said generator being responsive to temperature conditions of the evaporator, and absorption liquid circulating means between the generator and absorber operative to periodically accumulate absorption liquid and periodically introduce the accumulated absorption liquid into the absorber, said last-mentioned means being controlled by variations of pressure within said cycle and independent of the aforesaid heating means.

16. That improvement in the art of refrigerating by the aid of a system including a generator, a condenser, an evaporator and an absorber which consists in circulating a refrigerant through the system, circulating an absorption liquid between the generator and the absorber, circulating an inert gas between the evaporator and the absorber and controlling both the flow of absorption liquid from said generator to said absorber and the circulation of inert gas in accordance with the condition of the refrigerating agent in the evaporator.

17. The method of circulating absorption liquid in a refrigerating system which comprises evaporating refrigerant in proportion to demand for refrigeration and intermittently flowing absorption liquid into the vicinity of the evaporated refrigerant by utilizing and then equalizing throughout the system the reoccurring increase in pressure due to evaporation and the intermittent flow of absorption liquid.

18. The method of circulating absorption liquid in a refrigerating system which comprises evaporating refrigerant in proportion to demand for refrigeration, utilizing the rise of pressure of the refrigerant due to evaporation to raise weak absorption liquid into one vessel and then equalizing the pressure throughout the system to lower the absorption liquid into another vessel in the path of flow of said liquid to the vicinity of the evaporated refrigerant.

19. The method of circulating absorption liquid in a refrigerating system which comprises evaporating refrigerant in proportion to demand for refrigeration, utilizing increase in pressure due to evaporation to raise weak absorption liquid from a low placed vessel to a high placed vessel and then equalizing the pressure throughout the system to allow the liquid from the high placed vessel to flow to an intermediate placed vessel in the path of flow of said liquid to the vicinity of the evaporated refrigerant.

20. The method of refrigerating with an absorption system of the pressure equalized type having a generator, an absorber, and an evaporator, which includes utilizing increase in pressure in the evaporator to lift absorption liquid from the generator to a level above the absorber and then equalizing the pressures in the absorber and at said level to allow the liquid to flow into the absorber by gravity.

21. In absorption refrigerating apparatus of the pressure equalized type, a generator, an absorber above said generator, a circulation vessel above said absorber, a conduit for absorption liquid from the generator to said vessel, a conduit having a liquid trap from the absorber to the upper part of said vessel and connected to receive liquid from the absorber, a conduit from the lower part of said vessel to the upper part of the absorber and looped downwardly to form a second liquid trap, and a return conduit from the lower part of said absorber to the generator.

22. In absorption refrigerating apparatus of the pressure equalized type, means for flowing absorption liquid from the generator to the absorber at a higher level comprising a circulation vessel extending above the absorber, a conduit for liquid from the generator to said vessel, a conduit from the upper part of said vessel to said absorber, a liquid trap in said conduit adapted to receive liquid from the absorber, a conduit from the lower part of said vessel to the upper part of the absorber, and a liquid trap in last said conduit adapted to maintain a higher liquid column than the first said liquid trap.

23. In absorption refrigerating apparatus of the pressure equalized type, means for flowing absorption liquid from the generator to the absorber at a higher level, comprising a circulation vessel extending above the absorber, a conduit for liquid from the generator to said vessel, a conduit from the upper part of said vessel to the absorber having a liquid trap adapted to receive liquid from the absorber and a conduit from the lower part of said vessel to the upper part of said absorber looped downwardly below last said conduit.

24. That improvement in the art of refrigeration with an absorption type system including an evaporator, an absorber, and a generator, which consists in circulating absorption liquid between the generator and absorber, internally controlling the flow of absorption liquid from the generator to the absorber responsive to condition of the refrigerant in the evaporator, and circulating inert gas between the evaporator and absorber.

25. A refrigerating system comprising a generator, an absorber, an evaporator, and means dependent on condition of refrigerant in the evaporator for intermittently introducing measured quantities of absorption liquid into the absorber.

26. A refrigerating system comprising a generator, an absorber, an evaporator, and means dependent on the pressure in the evaporator for intermittently introducing measured quantities of absorption liquid into the absorber.

27. That improvement in the art of refrigerating through the agency of an absorption system of equalized pressure type including a generator, an absorber, and an evaporator, which comprises intermittently introducing measured quantities of absorption liquid into the absorber due to rise of pressure in the absorber and evaporator.

DONALD B. KNIGHT.